United States Patent
Frederickson et al.

(10) Patent No.: US 10,148,800 B1
(45) Date of Patent: Dec. 4, 2018

(54) ACOUSTIC COMPENSATION CHAMBER FOR A REMOTELY LOCATED AUDIO DEVICE

(71) Applicant: Apple Inc., Cupertino, CA (US)

(72) Inventors: Austin Frederickson, Cupertino, CA (US); Timothy E. Sandrik, Ben Lomond, CA (US); Mitchell Heschke, Los Altos Hills, CA (US); Lee Hamstra, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/720,709

(22) Filed: Sep. 29, 2017

(51) Int. Cl.
*H04M 1/03* (2006.01)
*H04B 1/03* (2006.01)
*H04R 1/28* (2006.01)

(52) U.S. Cl.
CPC .......... *H04M 1/035* (2013.01); *H04R 1/2853* (2013.01); *H04R 1/2884* (2013.01); *H04R 2499/11* (2013.01)

(58) Field of Classification Search
CPC .......... H04M 1/035; H04M 1/02; H04M 1/03; H04B 1/3833; H04B 1/03; H04B 5/0006; H04R 1/2884; H04R 2499/11; H04R 1/2853
See application file for complete search history.

(56) References Cited

U.S. PATENT DOCUMENTS

| | | | |
|---|---|---|---|
| 7,280,855 B2 | 10/2007 | Hawker et al. | |
| 2012/0093350 A1* | 4/2012 | He | H04R 1/025 381/332 |
| 2012/0106766 A1* | 5/2012 | Kuroda | H04M 1/035 381/337 |
| 2013/0070950 A1* | 3/2013 | Chen | H04R 1/222 381/353 |
| 2013/0129133 A1* | 5/2013 | Inoda | H04R 19/04 381/337 |
| 2013/0222192 A1* | 8/2013 | Seo | H01Q 1/243 343/702 |
| 2013/0251183 A1* | 9/2013 | Doller | H04R 1/086 381/368 |
| 2014/0079263 A1* | 3/2014 | Chang | H04R 1/2803 381/332 |
| 2014/0254836 A1* | 9/2014 | Tong | H04R 1/2803 381/120 |
| 2015/0198271 A1* | 7/2015 | Wright | F16L 15/04 285/90 |
| 2017/0082067 A1* | 3/2017 | Maqbool | F02K 7/04 |

* cited by examiner

*Primary Examiner* — Andrew Wendell
(74) *Attorney, Agent, or Firm* — Kilpatrick Townsend and Stockton, LLP

(57) ABSTRACT

An electronic device includes an internal microphone that is located remotely from a microphone aperture formed in the enclosure of the electronic device. An acoustic chamber is formed within the electronic device to couple the microphone to the microphone aperture. The acoustic chamber is designed with a particular length to volume ratio that amplifies a particular range of frequencies such that the microphone maintains equal sensitivity to a desired frequency band.

20 Claims, 4 Drawing Sheets

ACOUSTIC COMPENSATION CHAMBER FOR A REMOTELY LOCATED AUDIO DEVICE

BACKGROUND

Currently there are a wide variety of electronic devices that include one or more cameras and microphones that can be used to record video images and/or audio. As electronic devices become smaller and more aesthetically appealing, the location of the camera aperture and the microphone aperture on the exterior of the electronic device may become important factors. Further, as electronic devices become more compact, the available room within the electronic device for electronic components such as a camera module and a microphone is reduced so it may not be possible to place an electronic component directly adjacent to its corresponding aperture.

New electronic devices may require new features or new methods of implementing internal electronic components to fit them within the allowable space and couple them to their respective apertures.

SUMMARY

Some embodiments of the present disclosure relate to an internal microphone for an electronic device that is positioned remotely from a microphone aperture that is formed in the enclosure. Some embodiments include an acoustic chamber that couples the microphone to the acoustic aperture and that is configured to compensate for attenuation of a range of frequencies that can occur due to the remote location of the microphone from its corresponding aperture. The acoustic chamber can have a particular length to volume ratio that amplifies a particular range of frequencies such that the microphone maintains equal sensitivity to a desired frequency band of interest. In further embodiments the acoustic chamber can be used with a speaker, instead of a microphone, and the chamber can compensate for a particular range of frequencies that may be attenuated due to the remote location of the speaker from its corresponding aperture.

In some embodiments the acoustic chamber can be formed between an internal surface of the enclosure of the device and a plate that is secured to the internal surface with an adhesive. The internal surface of the enclosure can include a recess to increase a depth of the acoustic chamber. In some embodiments the adhesive can be electrically conductive and the plate can function as a ground plane for adjacent electronic components, such as a camera module.

In some embodiments an electronic device comprises an enclosure including a wall, the wall having an interior surface opposite an exterior surface and a first opening formed through the wall. A plate is attached to the interior surface such that an acoustic chamber is defined between the plate and the interior surface and a second opening is formed through the plate. An acoustic device is attached to the plate and aligned with the second opening such that the acoustic device is acoustically coupled to the first opening via the acoustic chamber and the second opening. The acoustic chamber has a first region proximate the first opening and a second region proximate the second opening, and a first volume of the first region is larger than a second volume of the second region.

In various embodiments the plate is attached to the interior surface with an adhesive layer. In some embodiments the adhesive layer is electrically conductive. In some embodiments a depth of the acoustic chamber is less than a thickness of the acoustic device. In various embodiments a recess is formed in the wall and the plate is positioned over the recess. In some embodiments a depth of the recess and a thickness of an adhesive layer positioned between the plate and the wall define a depth of the acoustic chamber. In various embodiments a protrusion is positioned in the recess and protrudes from a bottom surface of the recess towards the plate.

In some embodiments a first area of the first region is larger than a second area of the second region. In various embodiments a center of the first opening is separated from a center of the second opening by a distance greater than 1 millimeter. In some embodiments the electronic device further comprises a flexible circuit disposed between the acoustic device and the plate, wherein the flexible circuit electrically couples the acoustic device to circuitry within the electronic device. In various embodiments the flexible circuit includes a plurality of perforations in a region that aligns with the second opening. In some embodiments the acoustic device is a microphone. In various embodiments the acoustic device is a speaker.

In some embodiments an electronic device comprises an enclosure including a front wall positioned opposite a rear wall having an interior surface opposite an exterior surface and a first opening formed through the rear wall. A recess is formed in the rear wall, the recess extending from the interior surface to a second surface. A plate is positioned over the recess and attached to the interior surface with an adhesive layer such that an acoustic chamber is defined between the plate and the interior surface. A second opening is formed through the plate and an acoustic is device attached to the plate and aligned with the second opening such that the acoustic device is acoustically coupled to the first opening via the acoustic chamber and the second opening. A volume of the acoustic chamber changes along a length of the acoustic chamber.

In some embodiments the adhesive layer is electrically conductive. In various embodiments a depth of the acoustic chamber is less than a thickness of the acoustic device. In some embodiments the acoustic device is a microphone. In various embodiments the acoustic device is a speaker. In some embodiments the electronic device further comprises a camera module positioned within the enclosure and aligned with the plate. In some embodiments the electronic device further comprises a compressible conductive interface material positioned between the camera module and the plate.

To better understand the nature and advantages of the present disclosure, reference should be made to the following description and the accompanying figures. It is to be understood, however, that each of the figures is provided for the purpose of illustration only and is not intended as a definition of the limits of the scope of the present disclosure. Also, as a general rule, and unless it is evident to the contrary from the description, where elements in different figures use identical reference numbers, the elements are generally either identical or at least similar in function or purpose.

DETAILED DESCRIPTION

Figure 1:
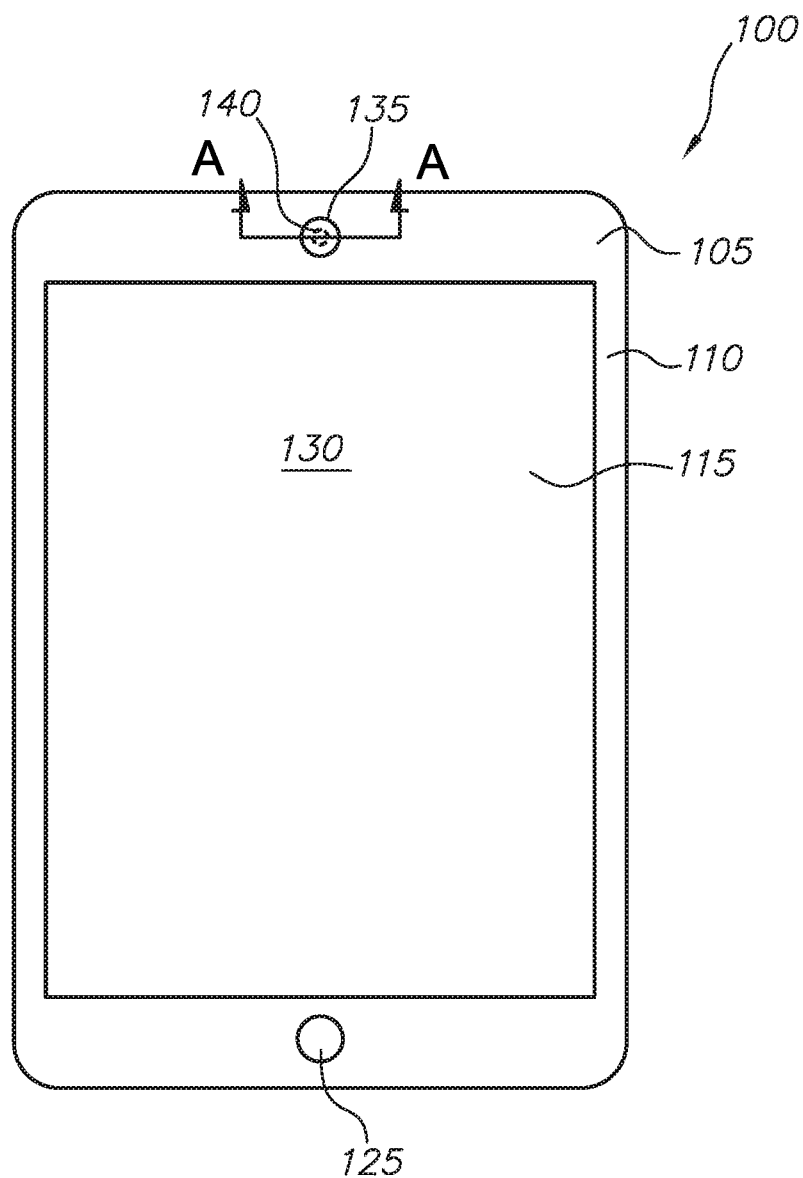
FIG. 1 is a front perspective view of an electronic device according to an embodiment of the disclosure.

Some embodiments of the present disclosure relate to electronic devices having a limited amount of internal space and that include an internal microphone that is remotely located from a microphone aperture formed in the electronic device enclosure. An acoustic chamber can be formed within the electronic device and used to couple the microphone to the microphone aperture. The acoustic chamber can be configured to compensate for attenuation of a range of frequencies that can occur due to the remote location of the microphone from its corresponding aperture. The acoustic chamber can have a particular length to volume ratio that amplifies a particular range of frequencies such that the microphone maintains equal sensitivity to the desired frequency band of interest. In further embodiments the acoustic chamber can be used with a speaker and a remotely located speaker aperture to compensate for a particular range of frequencies that may be attenuated due to the remote location of the speaker from its corresponding aperture.

While the present disclosure can be useful for a wide variety of configurations, some embodiments of the disclosure are particularly useful for electronic devices having little space for internal electrical components, electronic devices having aesthetic requirements that may require an acoustic opening in a particular location and/or for electronic devices that have small form factors, as discussed in more detail below.

For example, in some embodiments an electronic device can include an enclosure having a camera aperture on a front side and a microphone aperture on a back side positioned directly opposite the camera aperture. The electronic device may not have adequate internal space to position the internal microphone component in the same location as a camera module so the microphone may be located remotely from the microphone aperture. An acoustic chamber can be formed within the electronic device and used to couple the microphone to the remotely located microphone aperture. The acoustic chamber can be configured to compensate for attenuation of a range of frequencies that can occur due to the remote location of the microphone from the microphone aperture.

In some embodiments the acoustic chamber can be defined by a recess formed in an interior surface of the electronic device enclosure that is covered by a plate that extends across the recess and is attached to the interior surface of the enclosure with an adhesive. The microphone can be attached to the plate and aligned with a microphone device aperture within the plate. The microphone can be attached to a flexible circuit that enables it to communicate with other circuitry within the electronic device.

In another example the electronic device enclosure and the plate can be made from electrically conductive materials and attached together with an electrically conductive adhesive. An electronic component, such as a camera module, can be grounded to the plate through the adhesive and to the electronic device enclosure. In other examples a protrusion can be positioned within the recess such that it supports the plate from bowing when pressure is applied to it by an adjacent electronic component.

In a further example an electronic device can employ an acoustic chamber for use with a speaker and a speaker aperture instead of a microphone with a microphone aperture. More specifically, in some embodiments a speaker can be remotely located from a speaker aperture that allows sound to be ported to an external environment. An acoustic chamber can be disposed between the speaker and the speaker aperture and sized accordingly such that attenuated frequencies are amplified, providing a more uniform loudness for the speaker.

In order to better appreciate the features and aspects of electronic devices with microphones located remotely from microphone apertures, further context for the disclosure is provided in the following section by discussing one particular implementation of an electronic device according to embodiments of the present disclosure. These embodiments are for example only and other embodiments may be employed in other electronic devices.

For example, any device that receives or transmits audio signals can be used with the disclosure. In some instances, embodiments of the disclosure are particularly well suited for use with portable electronic media devices because of their potentially small form factor and aesthetic requirements. As used herein, an electronic media device includes any device with at least one electronic component that may be used to present human-perceivable media.

Such devices may include, for example, wearable electronic devices (e.g., Apple's watch), portable music players (e.g., MP3 devices and Apple's iPod devices), portable video players (e.g., portable DVD players), cellular telephones (e.g., smart telephones such as Apple's iPhone devices), video cameras, digital still cameras, projection systems (e.g., holographic projection systems), gaming systems, PDAs, as well as tablet (e.g., Apple's iPad devices), laptop or other mobile computers. Some of these devices may be configured to provide audio, video or other data or sensory output.

FIG. 1 is front plan view of an example electronic device 100 including an enclosure 105 defining an exterior surface 110. A screen 115 is attached to a housing 120, with the combination thereof forming enclosure 105. Screen 115 functions as an input/output device along with one or more buttons 125 that allow a user to communicate with electronic device 100. Electronic device 100 further includes a front surface 130 including a camera aperture 135 for capturing images. On a back surface (not shown in FIG. 1) opposite front surface 130, electronic device 100 includes a microphone aperture 140 that is coupled to an internal microphone (not shown in FIG. 1) that can be used to receive sound from the external environment, as described in more detail below. In the embodiment in FIG. 1, camera aperture 135 is located opposite of microphone aperture 140.

Figure 2:
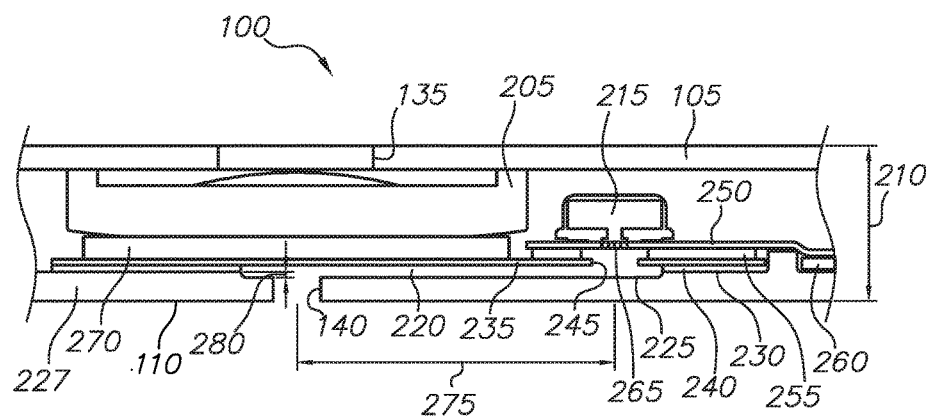
FIG. 2 is a simplified cross-sectional view of a portion of the electronic device shown in FIG. 1.

FIG. 2 illustrates a simplified cross-sectional view A-A of electronic device 100 illustrated in FIG. 1. As shown in FIG. 2, cross-section A-A is taken through camera aperture 135 and microphone aperture 140. A camera module 205 is located within enclosure 105 and is aligned with camera aperture 135. In the embodiment illustrated in FIG. 2 an electronic device thickness 210 is not adequate to position microphone 215 directly over microphone aperture 140 so microphone 215 is located to the side of camera module 205 and is displaced horizontally from microphone aperture 140. Microphone 215 is acoustically coupled to microphone aperture 140 via an acoustic chamber 220. Acoustic chamber 220 can have a particular size and volume configured to compensate for attenuation of acoustic energy due to the remote location of microphone 215 from microphone aperture 140, as discussed in more detail below.

Acoustic chamber 220 is defined by a recess 225 formed in an interior surface 230 of a rear wall 227 of enclosure 105. Recess 225 is covered by a plate 235 that extends across the recess and is attached to the interior surface of the enclosure with an adhesive 240. Acoustic chamber 220 is sealed except for microphone aperture 140 in enclosure 105 and microphone device port 245 formed in plate 235 such that sound can be received by microphone aperture 140 from the external environment and acoustic chamber 220 couples the sound to microphone 215.

In some embodiments microphone 215 is attached to a flexible circuit 250 that is attached to plate 235 with a circuit board adhesive 255. Flexible circuit 250 can be coupled to a circuit board 260 that enables microphone 215 to communicate with a processor within electronic device 100. Flexible circuit 250 includes one or more electrical traces that couple circuit board 260 to microphone 215.

In some embodiments flexible circuit 250 includes a plurality of perforations 265 in the region of microphone device port 245 such that acoustic energy can be coupled from acoustic chamber 220 to microphone 215. In some embodiments the diameter of plurality of perforations 265 have a diameter that allows acoustic energy to be coupled to microphone 215, but are small enough to act as a filter to prevent debris and contamination from entering the microphone. In one example a diameter of each of plurality of perforations 265 is between 25 and 75 microns. In other embodiments flexible circuit 250 can include a single opening in the region of microphone device port 245 instead of the plurality of perforations.

In some embodiments plurality of perforations 265 can be used to obviate the use of an acoustic mesh positioned over microphone aperture 140. More specifically, since microphone 215 is remotely located from microphone aperture 140 the likelihood of damage to microphone 215 through the microphone aperture is significantly reduced. Further if plurality of perforations 265 are used within flexible circuit 250 to shield debris from entering microphone 215, there may be no need to apply an acoustic mesh over microphone aperture 140, resulting in reduced cost and manufacturing complexity. In such embodiments, plate 235 can be coated with a black paint or other material to improve the aesthetics of microphone aperture 140 so a reflective surface is not seen within the microphone aperture.

In some embodiments camera module 205 is positioned between plate 235 and enclosure 105 as illustrated in FIG. 2. In one embodiment, plate 235 is made from stainless steel and is attached to enclosure 105 with adhesive 240 that is electrically conductive. In some embodiments camera module 205 can be grounded to enclosure 105 by positioning a compressible conductive interface material 270 between camera module 205 and plate 235. In various embodiments interface material 270 can be an electrically conductive foam or elastomer. In some embodiments adhesive 240 can be eliminated and plate 235 can be attached to enclosure 105 with fasteners, welding or any other joining process. In further embodiments flexible circuit 250 can be extended to provide an interconnect between camera module 205 and other electronics within electronic device 100.

In one embodiment enclosure 105 is made from a metal such as aluminum and recess 225 is machined or cast into interior surface 230. In other embodiments enclosure 105 can be made from a plastic or any other material.

In some embodiments the horizontal displacement of microphone 215 from microphone aperture 140 can result in attenuation of the frequency response of the microphone within a particular frequency range, in particular at the higher end of the frequency range. Acoustic chamber 220 can be designed to compensate for this attenuation such that microphone 215 meets a desired frequency response requirement. More specifically, in some embodiments it may be desirable for microphone 215 to have an equal sensitivity to acoustic signals throughout the audible frequency range. The horizontal displacement of microphone 215 from microphone aperture 140 can act as a quarter wave resonant tube causing a reduction in sensitivity of microphone above the resonant frequency of the resonant tube.

To compensate for the reduction in loudness, acoustic chamber 220 can be tuned to resonate at a particular range of frequencies that compensate for the attenuation providing microphone 215 an equal sensitivity to acoustic signals throughout the audible frequency range. More specifically, in some embodiments acoustic chamber 220 can be designed to have a specific volume versus length that enables acoustic energy to be coupled from microphone aperture 140 to microphone 215 without attenuating particular frequencies such that the microphone has an equal sensitivity to acoustic signals throughout a desired frequency range.

In some embodiments, acoustic chamber 220 can be particularly useful when a microphone to port distance 275 is 1 millimeter or greater. As microphone to port distance 275 increases above 1 millimeter the attenuation of higher frequencies can increase and the employment of acoustic chamber 220 can be used to compensate for the attenuation.

In further embodiments, as microphone to port distance 275 goes beyond 5 millimeters the effectiveness of acoustic chamber 220 may start to diminish. Of course these parameters are for example only and pertain to a particular configuration having a particular geometry. Other configurations will have different useful ranges and this disclosure is not limited to the configurations illustrated herein, but enables one of skill in the art to employ acoustic chambers in both smaller and larger configurations than disclosed herein. For example, in a larger configuration acoustic chambers may be useful when employed in electronic devices that have a microphone to port distance beyond 100 millimeters. Again, the aforementioned parameters are for example only and shall not be used to limit this disclosure to any particular size or configuration.

Figure 3:
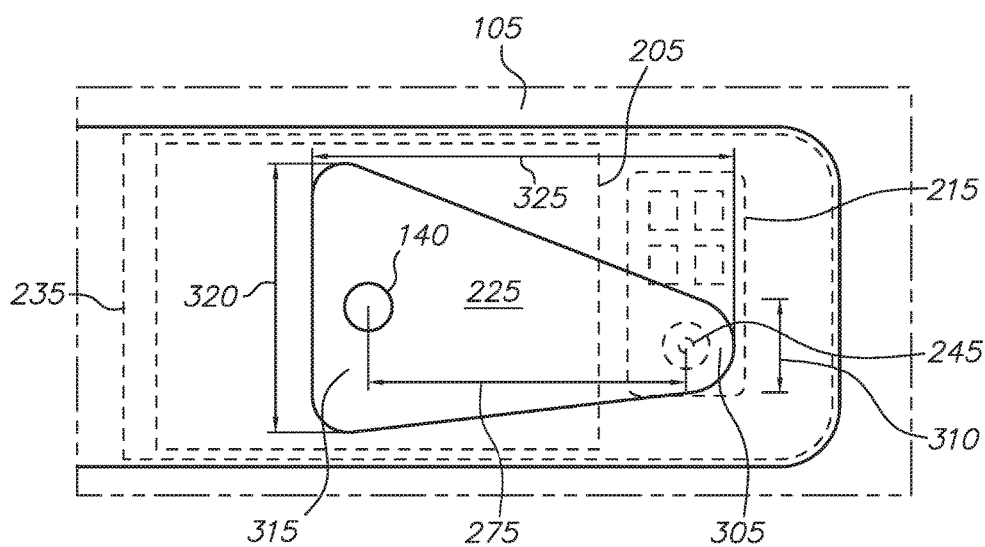
FIG. 3 is simplified plan view of a portion of the electronic device shown in FIG. 1.

FIG. 3 illustrates a plan view of the embodiment illustrated in FIG. 2. As shown in FIG. 3, camera module 205, microphone 215 and plate 235 are illustrated with hidden lines so enclosure 105 and recess 225 can be shown. In this embodiment recess 225 includes a triangularly shaped volume that is defined by a narrow region 305 having a first width 310 near microphone device port 245 and a widened region 315 having a second width 320 positioned near microphone aperture 140. In some embodiments first width 310 can be between 0.5 and 5 millimeters while in other embodiments it can be between 0.75 and 4 millimeters and in some embodiments between 1 and 3 millimeters.

In some embodiments second width 320 can be between 3 and 8 millimeters while in other embodiments it can be between 4 and 7 millimeters and in some embodiments between 5 and 6 millimeters. In some embodiments a length 325 of recess 225 can be between 4 and 9 millimeters while in some embodiments it is between 5 and 8 millimeters and in some embodiments between 6 and 7 millimeters.

A depth 280 of recess 225 is illustrated in FIG. 2 and in some embodiments can be between 0.1 and 1 millimeters while in other embodiments it can be between 0.15 and 0.5 millimeters and in some embodiments between 0.175 and 0.25 millimeters. Adhesive 240 can be used to add depth to acoustic chamber 220 and in some embodiments can have a thickness between 0.03 and 0.3 millimeters while in other embodiments it can be between 0.05 and 0.2 millimeters and in some embodiments between 0.075 and 0.15 millimeters.

Although recess 225 is illustrated in FIG. 3 as having a triangular shape, the recess can have any shape, including but not limited to square, circular, octagonal or rectangular, as described in more detail below. Further, although recess 225 is illustrated in FIG. 3 has having a uniform thickness, the recess can have any variation of thickness including but not limited to a sloped thickness, a contoured thickness or a stepped thickness, as also described in more detail below.

As illustrated in FIG. 3, a volume of acoustic chamber 220 (see FIG. 2) can change along microphone to port distance 275. More specifically, in narrow region 305 positioned proximate microphone device port 245, an area of acoustic chamber 220 is less than an area in widened region 315 positioned proximate microphone aperture 140. That is, as shown in FIG. 3, dividing acoustic chamber 220 into three regions that include a narrow region 305, a middle region (positioned between narrow region 305 and widened region 315) and a widened region 315, the area of acoustic chamber 220 is the least at narrow region 305, the largest at widened region 315 and in-between the least and the largest at the middle region. In this embodiment the volume changes due to the increase in area near widened region 315 and a constant depth, however in other embodiments a change in depth can be used to change the area, as discussed in more detail below.

In further embodiments adhesive 240 can be configured to retain its adhesive properties over an extended period of time (e.g., years) so it functions as a particle and debris "getter" within acoustic chamber 220. More specifically, in one example adhesive 240 is formulated to maintain its "tackiness" and debris that enters acoustic chamber 220 attaches to adhesive 240 so it does not enter microphone 215. As discussed above, in some embodiments adhesive 240 can be electrically conductive while in other embodiments it can be electrically insulative. Other embodiments can include a different area and/or a similar area of acoustic chamber 220 that is defined by different geometry as discussed in more detail below.

In some embodiments plate 235 can be made from a metal such as, for example, stainless steel. In other embodiments plate 235 can be made from a plastic, a ceramic or any other material. In various embodiments plate 235 has a thickness between 0.03 and 1 millimeter while in other embodiments it can be between 0.05 and 0.5 millimeters and in some embodiments between 0.075 and 0.125 millimeters.

Flexible circuit 250, as disclosed herein, describes a circuit that can include an insulating polymer film having conductive circuit patterns affixed thereto and can also include a polymer coating to protect the conductor circuits. Flexible circuits can include a single metal layer, double sided metal layers, multilayer and rigid/flex combination constructions. Flexible circuits can be formed by etching metal foil cladding (normally of copper) from polymer bases, plating metal or printing of conductive inks, among other processes. Flexible circuits can also include one or more electronic passive or active components attached thereto. Flexible circuits can be fabricated using a lamination process that adheres layers together with an adhesive or polymer under pressure, elevated temperature and/or vacuum.

Although the embodiment described above in FIGS. 2 and 3 is described for use with a microphone and the acoustic chamber is configured to compensate for the microphone being displaced from the microphone aperture, other embodiments can employ an acoustic chamber for use with a speaker instead of a microphone. More specifically, in some embodiments a speaker can be displaced from a speaker aperture that allows sound to be ported to an external environment. The distance between the speaker and the speaker aperture can result in attenuation of a certain range of frequencies, in particularly higher frequencies. An acoustic chamber can be disposed between the speaker and the speaker aperture and sized accordingly such that the attenuated frequencies are amplified, providing a more uniform loudness for the speaker as measured at the speaker aperture.

Figure 4:
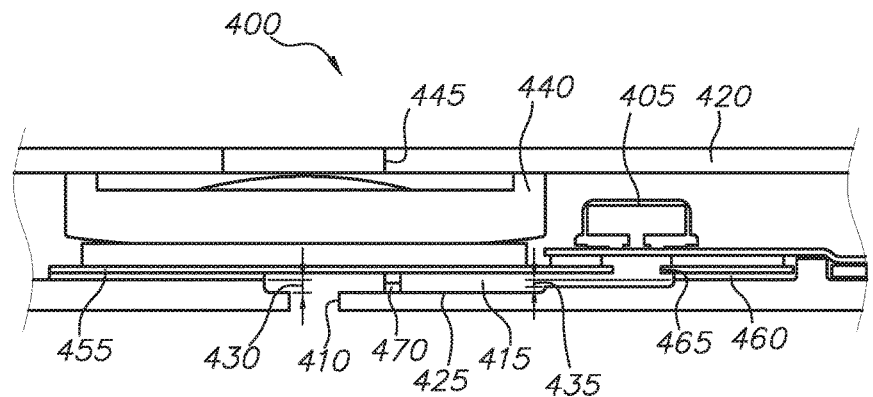
FIG. 4 is a simplified cross-sectional view of an electronic device similar to the electronic device illustrated in FIG. 1 according to an embodiment of the disclosure.
Figure 5:
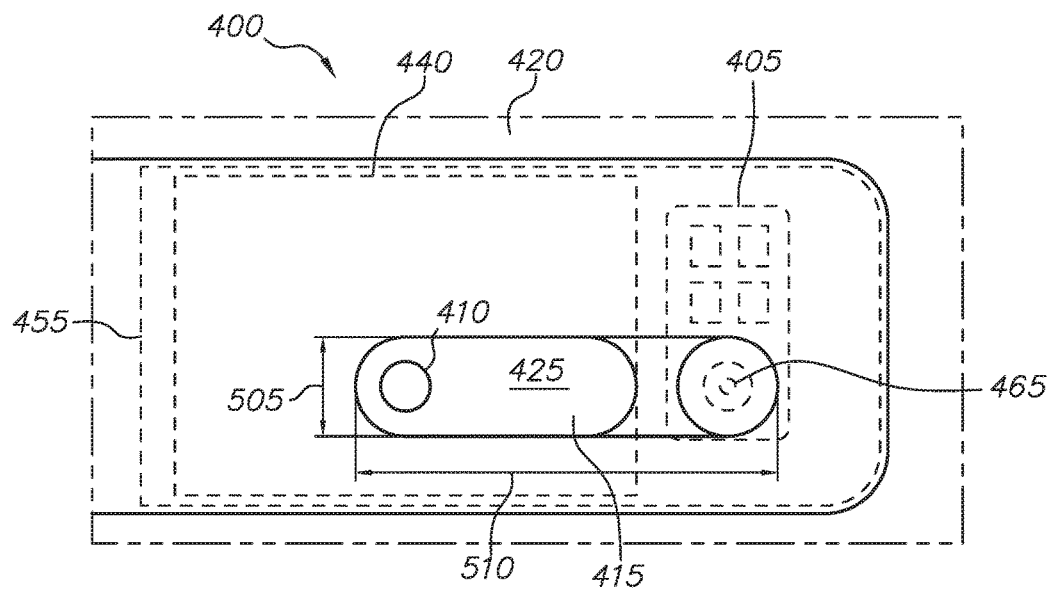
FIG. 5 is simplified plan view of a portion of the electronic device shown in FIG. 4.

Now referring simultaneously to FIGS. 4 and 5 another embodiment of an electronic device 400 having a microphone 405 displaced horizontally from a microphone aperture 410 is illustrated. The embodiment in FIGS. 4 and 5 is similar to the embodiment illustrated in FIGS. 2 and 3, however in FIGS. 4 and 5 the area of acoustic chamber 415 is defined by a recess 425 having two different depths. As shown in FIG. 4, electronic device 400 includes an enclosure 420 with recess 425 having a first depth 430 and a second depth 435 wherein the first depth is greater than the second depth.

As further shown in FIG. 4, a camera module 440 is located within enclosure 420 and is aligned with camera aperture 445. In the embodiment illustrated in FIG. 4 electronic device 400 does not have adequate thickness to position microphone 405 directly over microphone aperture 410 so microphone 405 is located to the side of camera module 440 and is displaced horizontally from microphone aperture 410. Microphone 405 is acoustically coupled to microphone aperture 410 via an acoustic chamber 415. Acoustic chamber 415 can have a particular size and volume configured to compensate for attenuation of acoustic energy due to the remote location of microphone 405 from microphone aperture 410, as discussed above.

Acoustic chamber 415 is defined by recess 425 formed in an interior surface 450 of enclosure 420 that is covered by a plate 455 that extends across the recess and is attached to the interior surface of the enclosure with an adhesive 460. Acoustic chamber 415 is sealed except for microphone aperture 410 in enclosure 420 and microphone device port 465 formed in plate 455 such that sound can be received by microphone aperture 410 from the external environment and acoustic chamber 415 couples the sound to microphone 405.

In some embodiments recess 425 can include a protrusion 470 positioned in the recess and protruding from a bottom surface of the recess towards plate 455. Protrusion 470 can be used to provide support for plate 455 in embodiments that apply pressure to plate, such as the embodiment shown in FIG. 4 having a compressible interface material 475 positioned between camera module 440 and plate 455. More specifically, in some embodiments compressible interface material 475 can be compressed during assembly of electronic device 400 such that it applies a force on plate 455.

Protrusion 470 can be used to prevent bowing of plate 455 in response to the applied force. In some embodiments protrusion 470 is integrally formed as a portion of enclosure 420. More specifically, in some embodiments protrusion 470 can be machined into or cast as an integral part of enclosure 420. In other embodiments protrusion 470 can be a separate component that is welded, glued or mechanically secured to enclosure 420 and/or plate 455. In one embodiment shown in FIG. 4, a portion of adhesive 460 can be used to bond protrusion 470 to plate 455.

As illustrated in FIGS. 4 and 5, and as similarly described above, a volume of acoustic chamber 415 can change along the microphone to port distance. More specifically, a first region of acoustic chamber 415 positioned proximate microphone device port 465 is less than an area in a second region that is positioned proximate microphone aperture 410. That is, as shown in FIG. 5, the volume of acoustic chamber 415 increases near microphone aperture 410 due to the increase in depth of the acoustic chamber while the width of the acoustic chamber remains constant.

Now referring to FIG. 5 a plan view of the embodiment illustrated in FIG. 4 is shown. As shown in FIG. 5, camera module 440, microphone 405 and plate 455 are illustrated with hidden lines so enclosure 420 and recess 425 can be shown. In this embodiment recess 425 includes a rectangularly shaped volume that is defined by a uniform width 505 extending from microphone device port 465 to microphone aperture 410. As discussed above, acoustic chamber 415 can be designed to compensate for attenuation such that microphone 405 meets a desired frequency response requirement.

In some embodiments width 505 of recess 425 can be between 0.5 and 4 millimeters while in other embodiments it can be between 1 and 3 millimeters and in some embodiments between 1.5 and 2.5 millimeters. In some embodiments a length 510 of recess 425 can be between 4 and 9 millimeters while in some embodiments it is between 5 and 8 millimeters and in some embodiments between 6 and 7 millimeters. Now referring to FIG. 4, in some embodiments first depth 430 is between 0.03 and 1 millimeter while in other embodiments it can be between 0.05 and 0.5 millimeters and in some embodiments between 0.075 and 0.125 millimeters. In some embodiments second depth 435 is between 0.03 and 1 millimeter while in other embodiments it can be between 0.05 and 0.5 millimeters and in some embodiments between 0.175 and 0.225 millimeters.

Although the embodiment described above in FIGS. 4 and 5 is described for use with a microphone and the acoustic chamber is configured to compensate for the microphone being displaced from the microphone aperture, other embodiments can employ an acoustic chamber for use with a speaker instead of the microphone. More specifically, in some embodiments a speaker may be displaced from a speaker aperture that allows sound to be ported to an external environment. The distance between the speaker and the speaker aperture can result in attenuation of a certain range of frequencies, in particularly higher frequencies. An acoustic chamber can be disposed between the speaker and the speaker aperture and sized accordingly such that the attenuated frequencies are amplified, providing a more uniform loudness for the speaker as measured at the speaker aperture.

Figure 6:
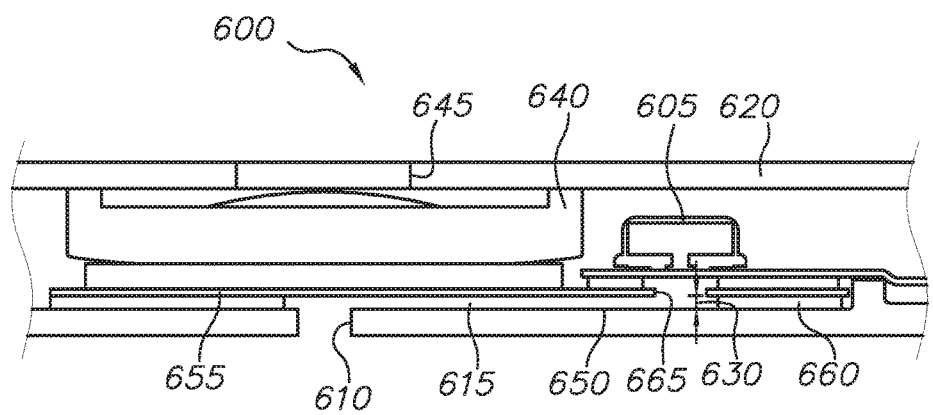
FIG. 6 is a simplified cross-sectional view of an electronic device similar to the electronic device illustrated in FIGS. 1 and 2 according to an embodiment of the disclosure.

Now referring to FIG. 6 another embodiment of an electronic device 600 having a microphone 605 displaced horizontally from a microphone aperture 610 is illustrated. The embodiment in FIG. 6 is similar to the embodiments illustrated in FIGS. 2-5, however in FIG. 6 a depth 630 of acoustic chamber 615 is defined only by a thickness of adhesive 660 rather than a combination of a depth of a recess formed in the enclosure and the adhesive thickness. As shown in FIG. 6, electronic device 600 includes an enclosure 620 that has a uniform interior surface.

As further shown in FIG. 6, a camera module 640 is located within enclosure 620 and is aligned with camera aperture 645. In the embodiment illustrated in FIG. 6 electronic device 600 does not have adequate thickness to position microphone 605 directly over microphone aperture 610 so microphone 605 is located to the side of camera module 640 and is displaced horizontally from microphone aperture 610. Microphone 605 is acoustically coupled to microphone aperture 610 via acoustic chamber 615. Acoustic chamber 615 can have a particular size and volume configured to compensate for attenuation of acoustic energy due to the remote location of microphone 605 from microphone aperture 610, as discussed above.

Acoustic chamber 615 is defined by a depth 630 formed between an interior surface 650 of enclosure 620 and a plate 655 that is attached to the interior surface of the enclosure with adhesive 660. In some embodiments depth 630 of acoustic chamber 615 can be between 0.03 and 1 millimeter while in other embodiments it can be between 0.05 and 0.5 millimeters and in some embodiments between 0.175 and 0.225 millimeters. Acoustic chamber 615 is sealed except for microphone aperture 610 in enclosure 620 and microphone device port 665 formed in plate 655 such that sound can be received by microphone aperture 610 from the external environment and acoustic chamber 615 couples the sound to microphone 605.

Although the embodiment described above in FIG. 6 is described for use with a microphone and the acoustic chamber is configured to compensate for the microphone being displaced from the microphone aperture, other embodiments can employ an acoustic chamber with a speaker instead of the microphone. More specifically, in some embodiments a speaker can be displaced from a speaker aperture that allows sound to be ported to an external environment. The distance between the speaker and the speaker aperture can result in attenuation of a certain range of frequencies, in particularly higher frequencies. An acoustic chamber can be disposed between the speaker and the speaker aperture and sized accordingly such that the attenuated frequencies are amplified, providing a more uniform loudness for the speaker as measured at the speaker port.

For simplicity, various internal components, such as the circuitry, graphics circuitry, bus, memory, storage device and other components of electronic devices 100, 400 and 600 are not shown in the figures.

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction. The specific details of particular embodiments may be combined in any suitable manner without departing from the spirit and scope of embodiments of the disclosure.

Additionally, spatially relative terms, such as "bottom or "top" and the like may be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as a "bottom" surface may then be oriented "above" other elements or features. The device may be otherwise oriented (e.g., rotated 90 degrees or at other orientations) and the spatially relative descriptors used herein interpreted accordingly.

What is claimed is:

1. An electronic device comprising:
   an enclosure including a wall, the wall having an interior surface opposite an exterior surface and a first opening formed through the wall;
   a plate attached to the interior surface such that an acoustic chamber is defined between the plate and the interior surface;
   a second opening formed through the plate; and
   an acoustic device attached to the plate and aligned with the second opening such that the acoustic device is acoustically coupled to the first opening via the acoustic chamber and the second opening;
   wherein the acoustic chamber has a first region proximate the first opening and a second region proximate the second opening, and wherein a first volume of the first region is larger than a second volume of the second region.

2. The electronic device of claim 1 wherein the plate is attached to the interior surface with an adhesive layer.

3. The electronic device of claim 2 wherein the adhesive layer is electrically conductive.

4. The electronic device of claim 1 wherein a depth of the acoustic chamber is less than a thickness of the acoustic device.

5. The electronic device of claim 1 wherein a recess is formed in the wall and the plate is positioned over the recess.

6. The electronic device of claim 5 wherein a depth of the recess and a thickness of an adhesive layer positioned between the plate and the wall define a depth of the acoustic chamber.

7. The electronic device of claim 5 wherein a protrusion is positioned in the recess and protrudes from a bottom surface of the recess towards the plate.

8. The electronic device of claim 1 wherein a first area of the first region is larger than a second area of the second region.

9. The electronic device of claim 1 wherein a center of the first opening is separated from a center of the second opening by a distance greater than 1 millimeter.

10. The electronic device of claim 1 further comprising a flexible circuit disposed between the acoustic device and the plate, wherein the flexible circuit electrically couples the acoustic device to circuitry within the electronic device.

11. The electronic device of claim 10 wherein the flexible circuit includes a plurality of perforations in a region that aligns with the second opening.

12. The electronic device of claim 1 wherein the acoustic device is a microphone.

13. The electronic device of claim 1 wherein the acoustic device is a speaker.

14. An electronic device comprising:
    an enclosure including a front wall positioned opposite a rear wall having an interior surface opposite an exterior surface;
    a first opening formed through the rear wall;
    a recess formed in the rear wall, the recess extending from the interior surface to a second surface;
    a plate positioned over the recess and attached to the interior surface with an adhesive layer such that an acoustic chamber is defined between the plate and the interior surface;
    a second opening formed through the plate; and
    an acoustic device attached to the plate and aligned with the second opening such that the acoustic device is acoustically coupled to the first opening via the acoustic chamber and the second opening;
    wherein a volume of the acoustic chamber changes along a length of the acoustic chamber.

15. The electronic device of claim 14 wherein the adhesive layer is electrically conductive.

16. The electronic device of claim 14 wherein a depth of the acoustic chamber is less than a thickness of the acoustic device.

17. The electronic device of claim 14 wherein the acoustic device is a microphone.

18. The electronic device of claim 14 wherein the acoustic device is a speaker.

19. The electronic device of claim 14 further comprising a camera module positioned within the enclosure and aligned with the plate.

20. The electronic device of claim 19 further comprising a compressible conductive interface material positioned between the camera module and the plate.

* * * * *